US012785090B2

(12) United States Patent
Kim et al.

(10) Patent No.: US 12,785,090 B2
(45) Date of Patent: Nov. 3, 2026

(54) ELECTRODE FOR SECONDARY BATTERY AND SECONDARY BATTERY COMPRISING THE SAME

(71) Applicant: LG Energy Solution, Ltd., Seoul (KR)

(72) Inventors: Myeongsoo Kim, Daejeon (KR); Jeonggil Kim, Daejeon (KR); Taegon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 892 days.

(21) Appl. No.: 17/769,932

(22) PCT Filed: Jul. 19, 2021

(86) PCT No.: PCT/KR2021/009280
§ 371 (c)(1),
(2) Date: Apr. 18, 2022

(87) PCT Pub. No.: WO2022/025506
PCT Pub. Date: Feb. 3, 2022

(65) Prior Publication Data
US 2022/0359869 A1 Nov. 10, 2022

(30) Foreign Application Priority Data
Jul. 28, 2020 (KR) ........................ 10-2020-0093982

(51) Int. Cl.
*H01M 4/505* (2010.01)
*H01M 4/04* (2006.01)
(Continued)

(52) U.S. Cl.
CPC ......... *H01M 4/505* (2013.01); *H01M 4/0404* (2013.01); *H01M 4/623* (2013.01);
(Continued)

(58) Field of Classification Search
CPC ..................................................... H01M 4/505
See application file for complete search history.

(56) References Cited

U.S. PATENT DOCUMENTS

2012/0189913 A1* 7/2012 Wakizaka ............. H01M 4/364 429/211
2014/0072697 A1 3/2014 Hiramatsu
(Continued)

FOREIGN PATENT DOCUMENTS

CN 101207190 A 6/2008
CN 104078651 A 10/2014
(Continued)

OTHER PUBLICATIONS

Search Report dated May 27, 2024 from Office Action for Chinese Application No. 202180005728.1 issued May 29, 2024. 2 pgs.
(Continued)

*Primary Examiner* — Maria Laios
*Assistant Examiner* — Zackary Richard Cochenour
(74) *Attorney, Agent, or Firm* — Lerner David LLP

(57) ABSTRACT

An electrode for secondary battery according to one embodiment of the present disclosure includes an electrode current collector; and an electrode composition, and an active material layer which includes an electrode composition and is formed on the electrode current collector, wherein the electrode composition includes an active material whose surface is dry-coated with a conductive material, and a binder which is dry-mixed with the active material.

15 Claims, 7 Drawing Sheets

(a)

(b)

(51) Int. Cl.

| | |
|---|---|
| ***H01M 4/62*** | (2006.01) |
| ***H01M 10/0525*** | (2010.01) |
| *H01M 4/02* | (2006.01) |

(52) U.S. Cl.

CPC ....... *H01M 4/625* (2013.01); *H01M 10/0525* (2013.01); *H01M 2004/021* (2013.01)

(56) References Cited

U.S. PATENT DOCUMENTS

| | | | |
|---|---|---|---|
| 2014/0315089 | A1 | 10/2014 | Yu et al. |
| 2015/0303481 | A1 | 10/2015 | Duong et al. |
| 2015/0349333 | A1 | 12/2015 | Park et al. |
| 2016/0181593 | A1 | 6/2016 | Jin et al. |
| 2017/0054140 | A1 | 2/2017 | Nanba et al. |
| 2018/0076446 | A1 | 3/2018 | Glock et al. |
| 2018/0175366 | A1 | 6/2018 | Zheng et al. |
| 2018/0277829 | A1* | 9/2018 | Konishi .................. H01M 4/13 |
| 2019/0140254 | A1 | 5/2019 | Kim et al. |
| 2020/0044257 | A1 | 2/2020 | Koo et al. |
| 2021/0098770 | A1* | 4/2021 | Yudi .................. H01M 4/0435 |
| 2021/0249657 | A1 | 8/2021 | Shin et al. |

FOREIGN PATENT DOCUMENTS

| | | | |
|---|---|---|---|
| CN | 105453313 | A | 3/2016 |
| CN | 105958055 | B | 3/2018 |
| CN | 107819112 | A | 3/2018 |
| CN | 109155393 | A | 1/2019 |
| CN | 110546787 | A | 12/2019 |
| JP | 2016072152 | A | 5/2016 |
| JP | 2017135105 | A | 8/2017 |
| KR | 20050052258 | A | 6/2005 |
| KR | 20140035241 | A | 3/2014 |
| KR | 20150060467 | A | 6/2015 |
| KR | 20150064697 | A | 6/2015 |
| KR | 20150069335 | A | 6/2015 |
| KR | 101666871 | B1 | 10/2016 |
| KR | 20180067428 | A | 6/2018 |
| WO | 2016210419 | A1 | 12/2016 |
| WO | 2019213068 | A1 | 11/2019 |
| WO | 2019222110 | A1 | 11/2019 |

OTHER PUBLICATIONS

Extended European Search Report including Written Opinion for Application No. 21848594.4 dated Jun. 15, 2023, pp. 1-11.

International Search Report for Application No. PCT/KR2021/009280 mailed Nov. 1, 2021, pp. 1-3.

* cited by examiner

【FIG. 1】
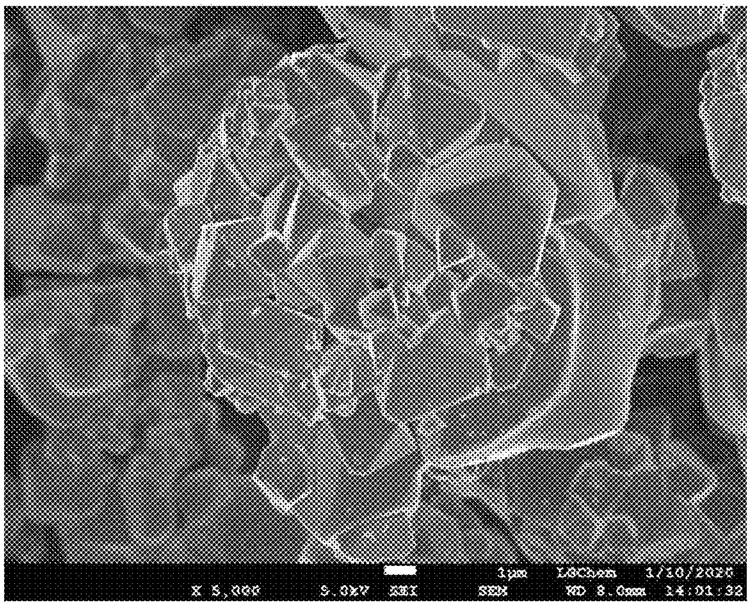

【FIG. 2】
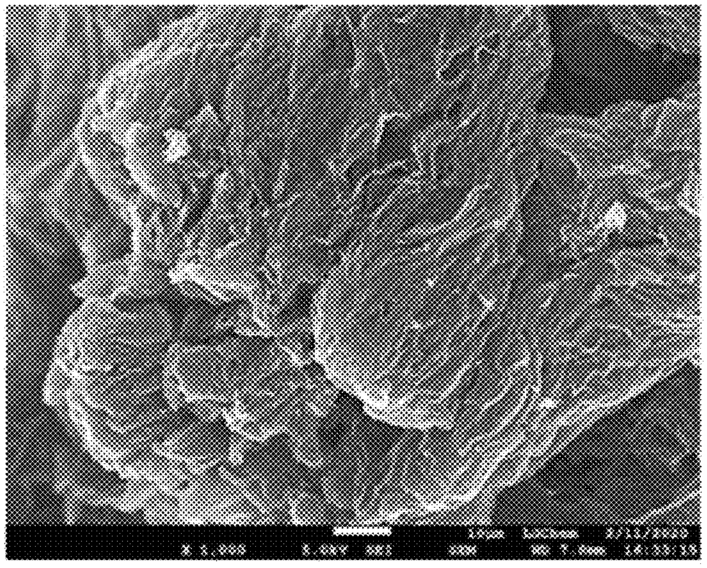
(a)
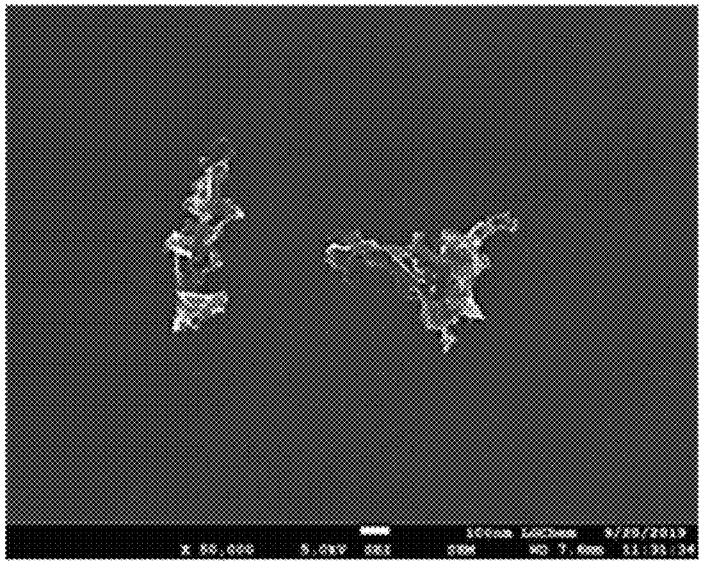
(b)

【FIG. 3】
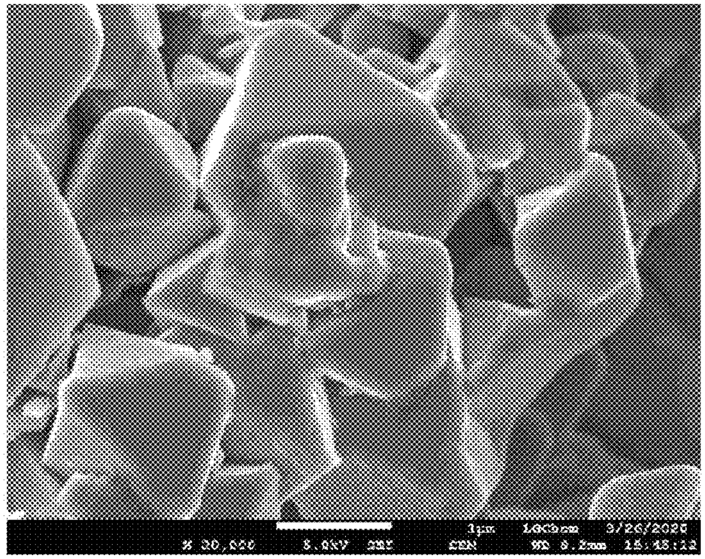
(a)
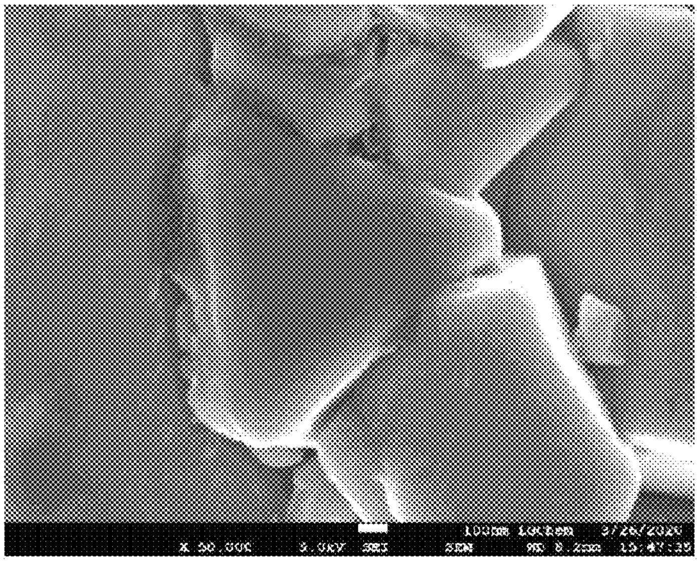
(b)

【FIG. 4】
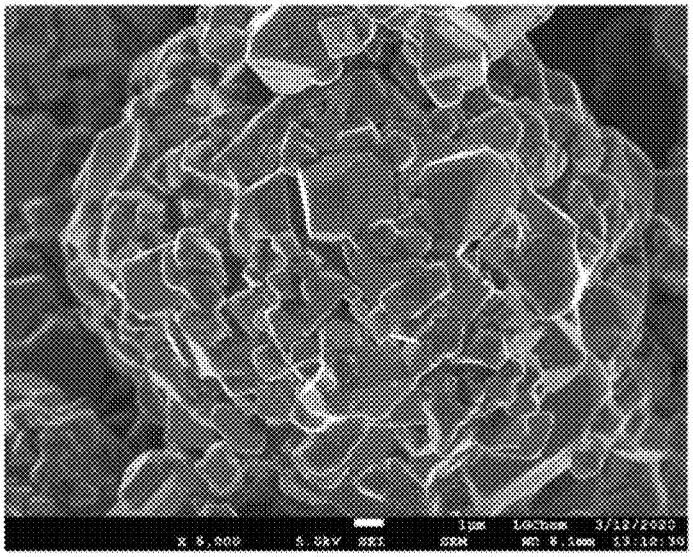
(a)
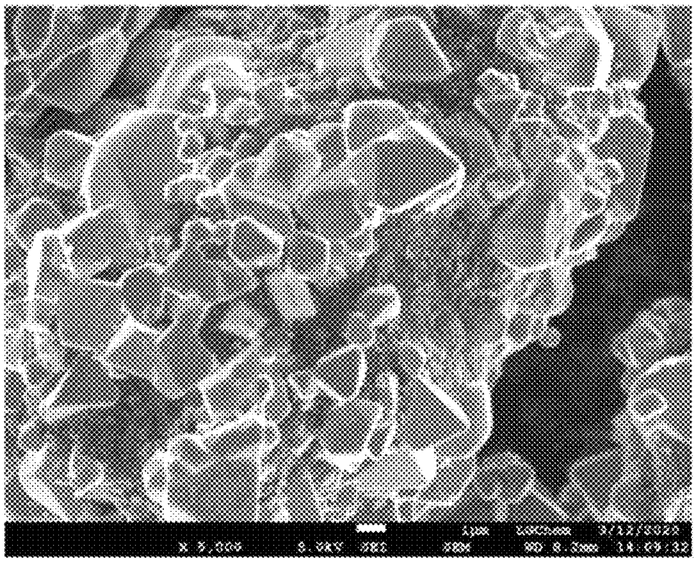
(b)

【FIG. 5】
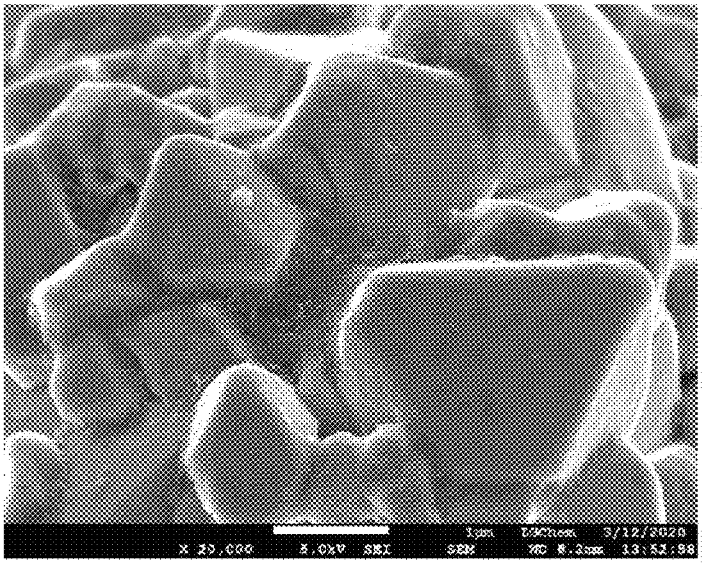
(a)
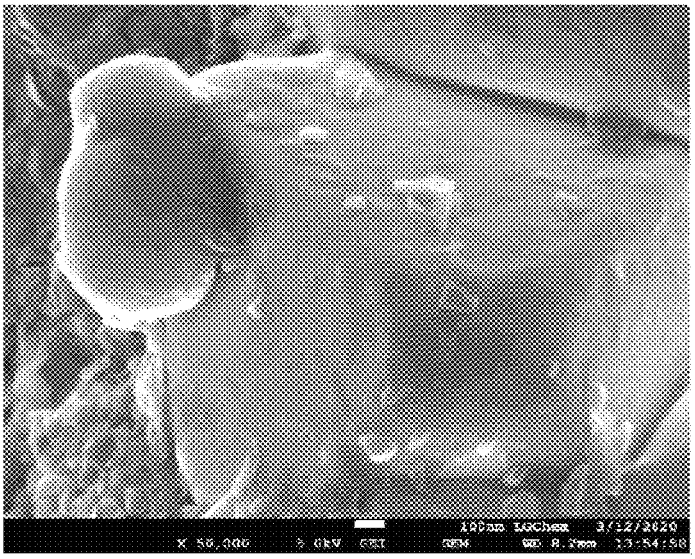
(b)

【FIG. 6】
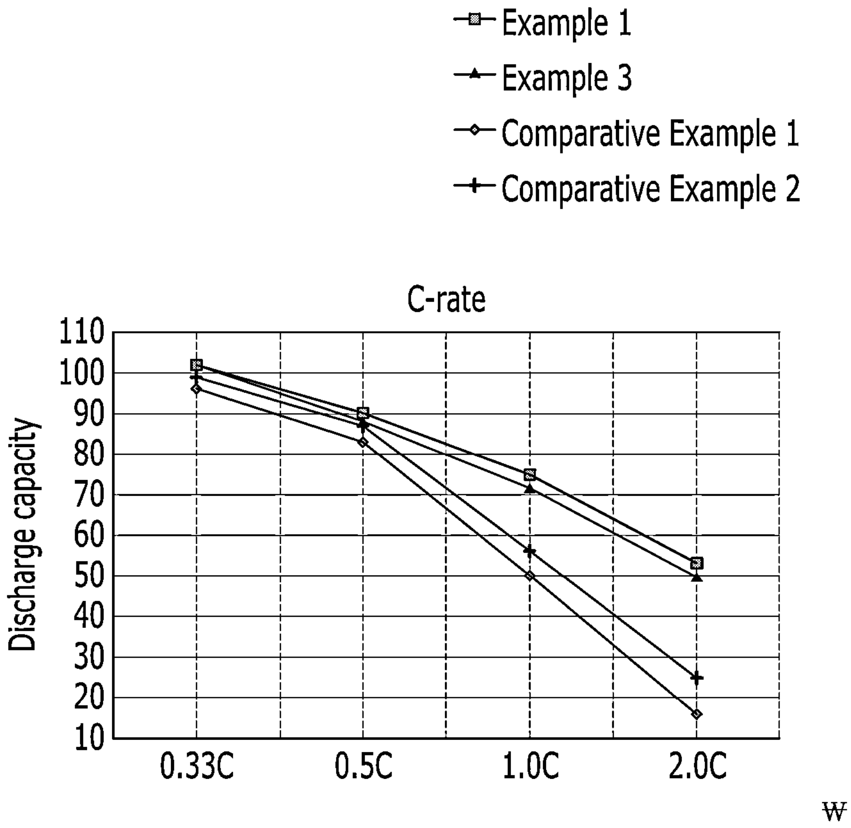

【FIG. 7】
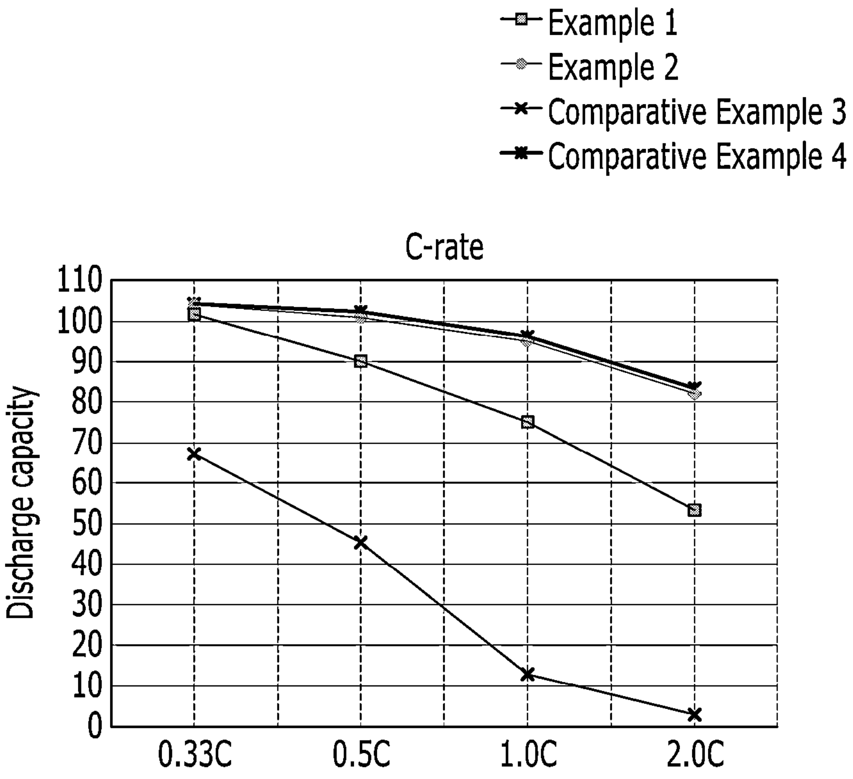

ELECTRODE FOR SECONDARY BATTERY AND SECONDARY BATTERY COMPRISING THE SAME

CROSS-REFERENCE TO RELATED APPLICATIONS

This application is a national phase entry under 35 U.S.C. § 371 of International Application No. PCT/KR2021/009280, filed on Jul. 19, 2021, which claims priority from Korean Patent Application No. 10-2020-0093982, filed on Jul. 28, 2020, the disclosures of which are incorporated herein by reference in their entirety.

TECHNICAL FIELD

The present disclosure relates to an electrode for secondary battery, and more particularly, to an electrode for secondary battery with improved cohesion and resistance reduction effect.

BACKGROUND ART

With the technology development and increased demand for mobile devices, demand for secondary batteries as energy sources has been rapidly increasing. Among these secondary batteries, a lithium secondary battery having high energy density and a high voltage, a long cycle lifespan, and a low self-discharge rate is commercially available and widely used.

In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

In addition, with the growing interest in environmental issues, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density and discharge voltage is being actively conducted, a part of which are in the commercialization stage.

In the conventional method of producing an electrode for a secondary battery, a separate additive or solvent has been used to surface-treat graphene on a metal oxide by a wet method. However, when the electrode is produced by a wet method, a heat treatment process at a high temperature is essential, and there was a risk that the metal oxide may be damaged. Therefore, there is a growing need to develop an electrode produced by a dry method.

DETAILED DESCRIPTION OF THE INVENTION

Technical Problem

It is an object of the present disclosure to provide an electrode for secondary battery with improved cohesion and resistance reduction effect.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided an electrode for secondary battery which comprises: an electrode current collector; and an active material layer which comprises an electrode composition and is formed on the electrode current collector, wherein the electrode composition comprises an active material whose surface is dry-coated with a conductive material, and a binder which is dry-mixed with the active material.

The conductive material may be a carbon graphene material having a size equal to or larger than a size of the active material.

The size of the active material and the size of the conductive material may have a ratio of 1:1 to 1:25.

The size of the active material may be 5 um to 30 um.

The size of the conductive material may be 25 um to 120 um.

The active material may be lithium manganese oxide (LMO).

The binder may be polytetrafluoroethylene (PTFE).

The electrode composition is prepared as a free-standing film, and the free-standing film may be attached on the electrode current collector.

The free-standing film may have a tensile strength of 9 $kgf/cm^2$ to 20 $kgf/cm^2$.

According to another embodiment of the present disclosure, there is provided a method for producing an electrode comprising the steps of: dry-coating a conductive material onto the surface of an active material; dry-mixing the active material coated with the conductive material and a binder to prepare an electrode composition; and attaching the electrode composition to an electrode current collector to form an electrode.

In the electrode composition, the active material, the conductive material, and the binder may be contained in a ratio of a parts by weight:b parts by weight:c parts by weight, respectively, the sum of a parts by weight and b parts by weight is 95 parts by weight to 99 parts by weight, and the c parts by weight may be 1 part by weight to 5 parts by weight.

The sum of a and b may be 96.5 parts by weight to 97.5 parts by weight, and c may be 2.5 parts by weight to 3.5 parts by weight.

a:b may be a ratio of 82.1 to 96.9 parts by weight:0.1 to 14.9 parts by weight.

The method further include a step of preparing the electrode composition as a free-standing film, wherein the free-standing film may be attached on the electrode current collector.

The free-standing film may have a tensile strength of 9 $kgf/cm^2$ to 20 $kgf/cm^2$.

According to yet another embodiment of the present disclosure, there is provided a secondary battery comprising the above-mentioned electrode for secondary battery.

Advantageous Effects

According to embodiments, a secondary battery produced by a dry method is provided, which can prevent damage to an active material and improve the cell performance of the secondary battery.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an enlarged SEM image of an active material contained in an electrode for a secondary battery according to one embodiment of the present disclosure;

FIG. 2 is an enlarged SEM image of a conductive material contained in an electrode for a secondary battery according to one embodiment of the present disclosure;

FIG. 3 is an SEM image taken at (a) 20,000× and (b) 50,000× magnification of an active material on which graphene is dry-coated onto the surface of the electrode for a secondary battery according to one embodiment of the present disclosure;

FIG. 4 is an SEM image taken at 5,000× magnification of (a) before and (b) after coating of an active material on which carbon black is dry-coated onto the surface of the electrode for a secondary battery according to a comparative example of the present disclosure;

FIG. 5 is an SEM image taken at (a) 20,000× and (b) 50,000× magnification of an active material on which graphene carbon is dry-coated onto the surface of the electrode for a secondary battery according to a comparative example of the present disclosure;

FIG. 6 is a graph for comparing discharge capacities of electrodes for secondary batteries according to Examples and Comparative Examples of the present disclosure depending on the size of a conductive material; and FIG. 7 is a graph for comparing discharge capacities of electrodes for secondary batteries according to Examples and Comparative Examples of the present disclosure depending on the content of the conductive material.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Further, the term "size value" as used herein means any of an average value, a maximum value, and a minimum value with respect to the size of objects. More preferably, the "size value" means an average value of the sizes of objects, but is not limited thereto.

An electrode for a secondary battery and a production method thereof according to one embodiment of the present disclosure will be described below.

An electrode for a secondary battery according to one embodiment of the present disclosure includes an electrode current collector, and an active material layer. More specifically, the active material layer includes an electrode composition and is formed on the electrode current collector. In particular, the electrode composition includes an active material whose surface is dry-coated with a conductive material, and a binder that is dry-mixed with the active material.

Further, the electrode composition is prepared as a free-standing film, and the free-standing film may be attached on the electrode current collector.

Here, the free-standing film may have a tensile strength of 9 $kgf/cm^2$ or more. More preferably, the free-standing film may have a tensile strength of 9 $kgf/cm^2$ or more and 50 $kgf/cm^2$ or less. In one example, the free-standing film may have a tensile strength of 9 $kgf/cm^2$ to 20 $kgf/cm^2$. When the above range is satisfied, the free-standing film may be one in which an active material, a conductive material, and a binder contained in the electrode composition may be mixed with each other with high cohesion. When the tensile strength of the free-standing film is too small, there is a problem that cracks occur between the electrode active materials in the electrode during charging and discharging, resistance increases, conductivity decreases, and lifespan characteristics also decrease.

Each component contained in the electrode for a secondary battery according to one embodiment of the present disclosure will be described in detail below.

The active material may be a positive electrode active material. The positive electrode active material may be, for example, a layered compound such as lithium cobalt oxide ($LiCoO_2$), lithium nickel oxide ($LiNiO_2$), or a compound substituted with one or more transition metals; lithium manganese oxides such as chemical formulae $Li_{1+x}Mn_{2-x}O_4$ (where x is 0 or more and 0.33 or less), $LiMnO_3$, $LiMn_2O_3$, $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxide represented by chemical formula $LiNi_{1-x}M_xO_2$ (where M=Co, Mn, Al, Cu, Fe, Mg, B or Ga, and x=0.01 or more and 0.3 or less); lithium manganese composite oxide represented by chemical formulae $LiMn_{2-x}M_xO_2$ (where M is Co, Ni, Fe, Cr, Zn or Ta, and x is 0.01 or more and 0.1 or less) or $Li_2Mn_3MO_8$ (where M is Fe, Co, Ni, Cu or Zn); lithium manganese composite oxide having a spinel structure represented by $LiNi_xMn_{2-x}O_4$; $LiMn_2O_4$ in which a part of Li in the chemical formula is substituted with an alkaline earth metal ion; a disulfide compound; $Fe_2(MoO_4)_3$, and the like.

FIG. 1 is an enlarged SEM image of an active material contained in an electrode for a secondary battery according to one embodiment of the present disclosure. Here, the active material of FIG. 1 is lithium manganese oxide (LMO).

The electrode for a secondary battery according to one embodiment of the present disclosure may include lithium manganese oxide (LMO) as an active material. Referring to FIG. 1, in the case of lithium manganese oxide (LMO), unevenness is formed on the surface of the active material, and the edges have a relatively sharp shape. Therefore, when coated or mixed with other components contained in the electrode composition, some materials may be stacked in the unevenness formed on the surface of the lithium manganese oxide. The materials stacked in the unevenness in this way may be a factor of deteriorating the cell performance.

The conductive material is used in order to impart conductivity to the electrode, and the conductive material can be used without particular limitation as long as it has electronic conductivity without causing chemical changes in the battery to be configured. Specific examples thereof include carbon-based materials such as carbon black, acetylene black, ketjen black, channel black, furnace black, lamp black, thermal black, carbon graphene and carbon fiber; graphite such as natural graphite and artificial graphite; metal powder or metal fibers such as copper, nickel, aluminum and silver; conductive whiskey such as zinc oxide and potassium titanate; conductive metal oxides such as titanium oxide; or a conductive polymer such as a polyphenylene derivative, and any one alone or a mixture of two or more of them may be used. The conductive material may be contained in an amount of 1% by weight to 30% by weight, based on the total weight of the electrode.

FIG. 2 is an enlarged SEM image of a conductive material contained in an electrode for a secondary battery according to one embodiment of the present disclosure. Here, the conductive material of FIG. 2 is a carbon graphene material.

Referring to FIG. 2, in the case of the carbon graphene material, it may have various sizes. In the case of FIG. 2(*a*), the carbon graphene material having an area larger than the size of the active material of FIG. 1 is enlarged and shown, and in the case of FIG. 2(*b*), the carbon graphene material having an area smaller than the size of the active material of FIG. 1 is enlarged and shown. The electrode for a secondary battery according to one embodiment of the present disclosure may include a carbon graphene material as a conductive material. Here, the carbon graphene material may be contained in a form of being coated onto the surface of the active material (e.g., encapsulating the active material). At this time, the carbon graphene material may be coated by a physical coating method as a strong shearing force is applied between the active material and the carbon graphene material. Thereby, the electrode for a secondary battery according to one embodiment of the present disclosure can allow the carbon graphene material to coat onto the surface of the active material in a dry manner without a separate solvent or additive, thereby prevent damage to the active material that occurs during the heat treatment process at a high temperature according to the existing coating method.

In the case of the carbon graphene material of FIG. 2(*a*), it has a larger area compared to the size of the unevenness formed on the surface of the active material of FIG. 1, so that it can be coated without the carbon graphene material stacked inside the unevenness formed on the surface of the active material. In contrast, in the case of the carbon graphene material of FIG. 2(*b*), it has a small area compared to the size of the unevenness formed on the surface of the active material of FIG. 1, so that a part of the carbon graphene material can be stacked inside the unevenness formed on the surface of the active material, or the coating ability can be reduced. Further, an effect of activating a conductive network can be reduced due to the carbon graphene material stacked inside the unevenness, which may cause an increase in resistance.

Therefore, the conductive material according to the present embodiment may be a carbon graphene material having the size equal to or larger than the size of the active material. Here, the size of the active material and the size of the conductive material may have a ratio of 1:1 to 1:25. In one example, the size of the active material may be 5 um to 30 um. In one example, the size of the conductive material may be 25 um to 120 um. When the size of the active material is smaller than the size of the conductive material, a part of the conductive material may be stacked inside the unevenness formed on the surface of the active material as described above, which causes an increase in resistance. Further, when the size of the conductive material is too large than the size of the active material, there is a problem that it is difficult to uniformly form the thickness of the conductive material, and it is not easy to adjust the content of the conductive material.

In conclusion, the electrode for a secondary battery according to one embodiment of the present disclosure includes, as a conductive material, a carbon graphene material having a large area compared to the size of the unevenness formed on the surface of the active material, thereby capable of improving the coating ability while preventing some materials from being stacked in the unevenness formed on the surface of the active material. Further, some materials are prevented from being stacked in the unevenness formed on the surface of the active material, so that the effect of activating the conductive network can be enhanced, and thus the resistance reduction effect can also be enhanced.

The binder performs a role of improving adhesion between positive electrode active material particles and an adhesive force between the positive electrode active material and the current collector. In one example, the binder may include a polymer material. Specific examples thereof include polytetrafluoroethylene (PTFE), polyvinylidene fluoride (PVDF), a vinylidene fluoride-co-hexafluoropropylene copolymer (PVDF-co-HFP), polyvinyl alcohol, polyacrylonitrile, carboxymethyl cellulose (CMC), starch, hydroxypropylcellulose, regenerated cellulose, polyvinyl pyrrolidone, tetrafluoroethylene, polyethylene, polypropylene, an ethylene-propylene-diene monomer (EPDM), a sulfonated EPDM, styrene butadiene rubber (SBR), fluoro rubber, or various copolymers thereof, and one alone or a mixture of two or more selected therefrom may be used as the binder. The binder may be contained in an amount of 1% by weight to 30% by weight with respect to the total weight of the electrode.

The electrode for a secondary battery according to one embodiment of the present disclosure may include polytetrafluoroethylene (PTFE) as a binder. Polytetrafluoroethylene (PTFE) may have a characteristic that fibers are drawn out from the particles as a shearing force is applied. In one example, as the electrode for a secondary battery according to one embodiment of the present disclosure contains polytetrafluoroethylene (PTFE) as a binder and thus a strong shearing force is applied to the active material, the conductive material, and the binder, fibrilization of polytetrafluoroethylene (PTFE) progresses, and the active material, the conductive material, and the binder can be mixed by a physical mixing method by the fibrillization of the binder.

Thereby, the electrode for a secondary battery according to one embodiment of the present disclosure can mix the active material, the conductive material, and the binder in a dry manner without a separate solvent or additive, so that it is possible to prevent damage to the active material that occurs during heat treatment process at high temperatures according to the existing mixing method, while being very effective for bridging between active material particles or bridging between active material particles and a current collector.

However, when polytetrafluoroethylene (PTFE) is mixed with a conductive material that is a carbon-based material, the van der Waals force between polytetrafluoroethylene (PTFE) and carbon-based materials is very strong, so that even if a shearing force is applied, an aggregation phenomenon may occur in which a part of polytetrafluoroethylene (PTFE) is not fibril-formed. Such aggregation phenomenon can reduce cohesion between active materials, and can also reduce tensile strength of the electrode.

Referring to FIG. 2, in the case of the carbon graphene material of FIG. 2(*b*), it has a small area compared to the size of the unevenness formed on the surface of the active material of FIG. 1, so that a part of the carbon graphene material may be stacked inside the unevenness formed on the surface of the active material. At this time, the carbon graphene material stacked inside the unevenness of the active material may be discharged from the inside of the unevenness of the active material to the outside during the mixing process with polytetrafluoroethylene (PTFE), which causes an aggregation phenomenon in which a part of polytetrafluoroethylene (PTFE) is not fibril-formed.

In contrast, in the case of the carbon graphene material of FIG. 2(*a*), it has a large area compared to the size of the unevenness formed on the surface of the active material of FIG. 1, so that it can be coated without a material accumulating inside the unevenness formed on the surface of the active material. Therefore, the electrode for a secondary battery according to one embodiment of the present disclosure includes a carbon graphene material having a large area compared to the size of the unevenness formed on the surface of the active material as a conductive material as shown in FIG. 2(*a*), whereby while preventing some materials from being stacked in the unevenness formed on the surface of the active material, it is also possible to prevent an aggregation phenomenon in which a part of polytetrafluoroethylene (PTFE) is not fibril-formed. Further, by preventing the aggregation phenomenon, cohesion between active materials can be increased, and tensile strength of the electrode can also be increased.

The electrode composition contained in the electrode for a secondary battery according to one embodiment of the present disclosure is configured such that the active material, the conductive material, and the binder are mixed in an appropriate ratio. Here, the electrode composition may include active material:conductive material:binder in a ratio of a parts by weight:b parts by weight:c parts by weight. Here, the sum of a and b may be 90 parts by weight to 99.9 parts by weight, and c may be 0.1 parts by weight to 10 parts by weight. More preferably, the sum of a and b may be 95 to 99 parts by weight, and c may be 1 to 5 parts by weight. When the binder (c) is contained in a ratio of less than 1 part by weight in the entire electrode composition, the bridging effect between particles inside the electrode composition can be reduced, which causes problems that a tensile strength is reduced and cracks occur in the active material layer during charging and discharging. In addition, when the binder (c) is contained in a ratio of more than 5 parts by weight in the electrode composition, there is a problem that the content of the active material and the conductive material inside the electrode composition is reduced, and thus the cell performance is reduced.

In one example, the sum of a and b is 96.5 parts by weight to 97.5 parts by weight, and c may be 2.5 parts by weight to 3.5 parts by weight. At this time, a:b may have a ratio of 82.1 parts by weight to 96.9 parts by weight:0.1 parts by weight to 14.9 parts by weight. More preferably, a:b may have a ratio of 86.0 parts by weight to 96.9 parts by weight:0.1 parts by weight to 10 parts by weight. When the active material (a) and the conductive material (b) satisfy the above range, the bridging effect between particles inside the electrode composition is excellent and thus the tensile strength may be excellent, and the rate of change in the discharge capacity value of the electrode containing the electrode composition is also reduced, so that the resistance reduction effect can be excellent. When the active material (a) and the conductive material (b) are out of the above range, there are problems that a tensile strength is reduced due to the reduction in the bridging effect between particles inside the electrode composition, and/or the resistance reduction effect is reduced due to the increase in the rate of change of the discharge capacity value of the electrode containing the electrode composition.

The above-described electrode for a secondary battery may be included as a positive electrode in a secondary battery according to another embodiment of the present disclosure. More specifically, the secondary battery according to another embodiment of the present disclosure may include an electrode assembly including the positive electrode, the negative electrode, and a separator interposed between the positive electrode and the negative electrode, and an electrolyte.

The negative electrode may be produced by coating a negative electrode composition including a negative electrode active material, a binder, a conductive material, and the like onto the negative electrode current collector, similarly to the electrode for a secondary battery.

The negative electrode may also be produced in a form in which the negative electrode composition including the negative electrode active material is attached or coated onto the negative electrode current collector, and the negative electrode composition may also further include the conductive material and binder as described above, together with the negative electrode active material.

As the negative electrode active material, a negative electrode active material for a lithium secondary battery, which is common in the technical field, can be used. In one example, materials such as lithium metal, lithium alloy, petroleum coke, activated carbon, graphite, silicon, tin, metal oxide or other carbons can be used.

The negative electrode current collector is not particularly limited as long as it has high conductivity without causing chemical changes to the battery. For example, copper, stainless steel, aluminum, nickel, titanium, calcined carbon, copper or stainless steel having a surface treated with carbon, nickel, titanium, silver, etc., aluminum-cadmium alloy, and the like may be used. In addition, the negative electrode current collector may generally have a thickness of 3 μm to 500 μm, and, similarly to the positive electrode current collector, can have fine unevenness formed on the surface thereof to enhance the binding strength of the negative electrode active material. For example, it may be used in various forms such as films, sheets, foils, nets, porous bodies, foams and nonwoven fabrics.

The separator separates the negative electrode and the positive electrode, and provides a passage for lithium ions to migrate. Any separator can be used without particular limitation as long as it is generally used as a separator in a lithium secondary battery. In particular, a separator having excellent moisture-retention ability for an electrolyte while having low resistance to the migration of electrolyte ions is preferable. Specifically, a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure having two or more layers thereof can be used. Further, a conventional porous nonwoven fabric, for example, a nonwoven fabric made of high melting point glass fiber, polyethylene terephthalate fiber, or the like can be used. Further, in order to secure heat resistance or mechanical strength, a coated separator containing a ceramic component or a polymer material can be used, and optionally, a single layer or a multilayer structure can be used.

In addition, the electrolyte solution used in the present disclosure may include, but is not limited to, an organic liquid electrolyte, an inorganic liquid electrolyte, a solid polymer electrolyte, a gel type polymer electrolyte, a solid inorganic electrolyte, a molten inorganic electrolyte or the like which can be used in the production of a lithium secondary battery.

Specifically, the electrolyte solution may include an organic solvent and a lithium salt.

As the organic solvent, any solvent can be used without particular limitation as long as it can serve as a medium through which ions involved in the electrochemical reaction of the battery can migrate.

The lithium salt can be used without particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, $LiB(C_2O_4)_2$, or the like can be used as the lithium salt.

In order to improve the lifespan characteristics of the battery, suppress a reduction in battery capacity and improve discharge capacity of the battery, the electrolyte solution may further include, for example, one or more additives such as a halo-alkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinones, N,N-substituted imidazolidine, ethylene glycol dialkyl ether, an ammonium salt, pyrrole, 2-methoxy ethanol, or aluminum trichloride, in addition to the above electrolyte components.

Below, the contents of the present disclosure will be described by way of examples, but the following examples are for illustrative purposes only, and the scope of the present disclosure is not limited thereto.

Example 1

An active material was prepared from a 1% solution in which lithium manganese oxide (LMO) was dispersed in water. The volume distribution was measured with a Malvern Mastersizer 3000 device, and lithium manganese oxide having a particle size distribution D99 value of 27 um was prepared. Here, the D99 value of the particle size distribution means a size value including 99%, when the particles were arranged in order of size, and is commonly used to represent the maximum size of the active material. Together with this, carbon graphene having an average size value of 30 um as observed with a transmission electron microscope (TEM) and measured in about 20 or more images, was prepared as a conductive material.

Then, lithium manganese oxide (LMO) and carbon graphene were pre-mixed using a Waring blender device, and then a conductive material was carbon-coated onto the surface of lithium manganese oxide in a dry manner using a Nobilta device (Hosokawa Micron). At this time, lithium manganese oxide and carbon graphene were mixed in a ratio of lithium manganese oxide:carbon graphene=96 parts by weight:1 part by weight.

Example 2

An electrode composition was prepared in the same manner as in Example 1, except that in Example 1, the electrode composition was prepared by being mixed in a ratio of lithium manganese oxide:carbon graphene=92 parts by weight:5 parts by weight.

Example 3

An electrode composition was prepared in the same manner as in Example 1, except that in Example 1, the electrode composition was prepared by being mixed with a carbon graphene having an average size value of 100 um as observed with a transmission electron microscope (TEM) and measured in about 20 or more images.

Comparative Example 1

An electrode composition was prepared in the same manner as in Example 1, except that in Example 1, the electrode composition was prepared by being mixed with carbon black having a size of 100 nm or less as a conductive material.

Comparative Example 2

An electrode composition was prepared in the same manner as in Example 1, except that in Example 1, the electrode composition was prepared by being mixed with a carbon graphene having an average size value of 0.2 um as observed with a transmission electron microscope (TEM) and measured in about 20 or more images.

Comparative Example 3

An electrode composition was prepared in the same manner as in Example 1, except that in Example 1, the electrode composition was prepared by being mixed in a ratio of lithium manganese oxide:carbon graphene=96.95 parts by weight:0.05 parts by weight.

Comparative Example 4

An electrode composition was prepared in the same manner as in Example 1, except that in Example 1, the electrode composition was prepared by being mixed in a ratio of lithium manganese oxide:carbon graphene=82 parts by weight:15 parts by weight.

Experimental Example 1 (SEM Image Analysis)

SEM images of the carbon-coated lithium manganese oxide prepared in Example 1, Comparative Example 1, and Comparative Example 2 were analyzed, and the results are shown in FIGS. 3 to 5.

FIG. 3 is an SEM image taken at (a) 20,000× and (b) 50,000× magnification of an active material on which graphene is dry-coated onto the surface of the electrode for a secondary battery according to one embodiment of the present disclosure. FIG. 4 is an SEM image taken at 5,000× magnification of (a) before and (b) after coating of an active material on which carbon black is dry-coated onto the surface of the electrode for a secondary battery according to a comparative example of the present disclosure. FIG. 5 is an SEM image taken at (a) 20,000× and (b) 50,000× magnification of an active material on which graphene carbon is dry-coated onto the surface of the electrode for a secondary battery according to a comparative example of the present disclosure.

Experimental Example 1 and FIGS. 1 and 3 to 5 will be described together below.

Referring to FIGS. 1 and 3, it can be confirmed that the carbon-coated lithium manganese oxide of Example 1 satisfactorily coats the surface of the active material without any carbon material stacked inside the unevenness formed on the surface of the lithium manganese oxide. It can be confirmed from this that in the case of Example 1, the size (30 um) of carbon graphene is larger than the size (27 um) of lithium manganese oxide, so that it is difficult for carbon graphene to be stacked inside the unevenness formed on the surface of the lithium manganese oxide.

On the other hand, referring to FIG. 4(*b*), it can be confirmed that the carbon-coated lithium manganese oxide of Comparative Example 1 is carbon-coated by generating bending on the surface of the lithium manganese oxide as compared to FIG. 4(*a*), but it can be confirmed that a number of carbon materials are stacked inside the unevenness formed on the surface of lithium manganese oxide. It can be confirmed from this that in Comparative Example 1, the size of carbon black (100 nm or less) is much smaller than the size (27 um) of lithium manganese oxide, and so it is very easy for carbon black to be stacked inside the unevenness formed on the surface of lithium manganese oxide.

Further, referring to FIGS. 1 and 5, it can be confirmed that the carbon-coated lithium manganese oxide of Comparative Example 2 is also carbon-coated by generating bending on the surface of the lithium manganese oxide compared to FIG. 1, but it can be confirmed that a number of carbon materials are stacked inside the unevenness formed on the surface of the lithium manganese oxide. It can be confirmed from this that in Comparative Example 2, the size (0.2 um) of carbon graphene is smaller than the size (27 um) of lithium manganese oxide, and thus, it is easy for carbon graphene to stack inside the unevenness formed on the surface of lithium manganese oxide.

Thereby, the electrode for a secondary battery according to one embodiment of the present disclosure can prevent the carbon material from being stacked inside the unevenness formed on the surface of the lithium manganese oxide by carbon-coating the lithium manganese oxide with carbon graphene that is larger than the size of the lithium manganese oxide. Therefore, the coating ability of the carbon-coated lithium manganese oxide can be improved, and the conductive network is also be activated, and the effect of increasing resistance can be reduced. In addition, in the subsequent mixing process with polytetrafluoroethylene (PTFE), the aggregation phenomenon of polytetrafluoroethylene (PTFE) due to the carbon material inside the unevenness can also be prevented.

Experimental Example 2 (Measurement of Tensile Strength)

The carbon-coated lithium manganese oxide prepared in Examples 1 to 3 and Comparative Examples 1 to 4 and polytetrafluoroethylene (PTFE) binder were pre-mixed using a Waring blender device, and then mixed in a dry manner using a paste mixer (DAEHWA Tech) and the polymer was activated to prepare an electrode composition. At this time, polytetrafluoroethylene was mixed in a ratio of lithium manganese oxide+carbon graphene:polytetrafluoroethylene=97 parts by weight:3 parts by weight in the electrode composition.

The electrode compositions prepared in Examples 1 to 3 and Comparative Examples 1 to 4, respectively, and a roll mill device (Inoue Seisakusho) were used to produce a free-standing film having a length of 20 mm and a width of 20 mm. Both ends of each produced free-standing film were fixed with a jig, and then, the tensile strength of the free-standing film was measured at a speed of 50 mm/min using an Instron UTM device, respectively, and the results are shown in Table 1 below.

TABLE 1

| | Composition | | | | | | | Tensile |
|---|---|---|---|---|---|---|---|---|
| | LMO | | Conductive material | | | PTFE | | |
| | Wt. (%) | Size (um) | Kind | Wt. (%) | Size (um) | Wt. (%) | strength ($kgf/cm^2$) |
| Example 1 | 96 | 27 | graphene | 1 | 30 | 3 | 11 |
| Example 2 | 92 | 27 | graphene | 5 | 30 | 3 | 10 |
| Example 3 | 96 | 27 | graphene | 1 | 100 | 3 | 11 |
| Comparative Example 1 | 96 | 27 | carbon black | 1 | 100 nm or less | 3 | 1 |
| Comparative Example 2 | 96 | 27 | graphene | 1 | 0.2 | 3 | 3 |
| Comparative Example 3 | 96.95 | 27 | graphene | 0.05 | 30 | 3 | 8 |
| Comparative Example 4 | 82 | 27 | graphene | 15 | 30 | 3 | 1 |

Experimental Example 2 and Table 1 will be described together below.

First, when comparing Example 1, Example 3, Comparative Example 1, and Comparative Example 2, in which the composition of the free-standing film is the same as lithium manganese oxide:conductive material:polytetrafluoroethylene=96 parts by weight:1 part by weight:3 parts by weight, it is confirmed that both Example 1 and Example 3 have excellent tensile strength of 11 $kgf/cm^2$, but it can be confirmed that Comparative Example 1 and Comparative Example 2 are very low at 1 $kgf/cm^2$ and 3 $kgf/cm^2$, respectively. This is different in that Examples 1 and 3 have values of 30 um and 100 um in which the size of the conductive material are equal to or larger than the size (27 um) of lithium manganese oxide, but Comparative Examples 1 and 2 have values of 100 nm or less or 0.2 um in which the size of the conductive material is smaller than the size (27 um) of the lithium manganese oxide.

Thereby, it can be confirmed that the tensile strength of the free-standing film satisfactorily exhibits when the size of the conductive material has a value equal to or larger than the size (27 um) of lithium manganese oxide.

Further, when comparing Examples 1, Example 2, Comparative Example 3, and Comparative Example 4 in which the size (27 um) of lithium manganese oxide and the size (30 um) of the conductive material are the same, it is confirmed that the tensile strengths of Examples 1 and 2 are excellent at 11 $kgf/cm^2$ and 10 $kgf/cm^2$, respectively, but it can be confirmed that Comparative Example 3 is slightly high at 8 $kgf/cm^2$ and Comparative Example 4 is very low at 1 $kgf/cm^2$.

There is a difference in that Example 1 contains lithium manganese oxide and carbon graphene in a ratio of lithium manganese oxide:carbon graphene=96 parts by weight:1 part by weight, whereas Comparative Example 3 contains in a ratio of lithium manganese oxide:carbon graphene=96.95 parts by weight:0.05 parts by weight. Thereby, when the free-standing film contains a very small amount of carbon graphene compared to lithium manganese oxide as in Comparative Example 3, it can be confirmed that the tensile strength is relatively deteriorated.

relative to lithium manganese oxide is shown in FIG. 6. FIG. 6 is a graph for comparing discharge capacities of electrodes for secondary batteries according to Examples and Comparative Examples of the present disclosure depending on the size of a conductive material.

Further, the comparison result of the discharge capacity value according to the ratio of the weight of the lithium manganese oxide and the weight of the conductive material is shown in FIG. 7. FIG. 7 is a graph for comparing discharge capacities of electrodes for secondary batteries according to Examples and Comparative Examples of the present disclosure depending on the content of the conductive material.

TABLE 2

| | Composition | | | | | | Discharge capacity | | | |
|---|---|---|---|---|---|---|---|---|---|---|
| | LMO | | Conductive material | | | PTFE | (mAh/g) | | | |
| | Wt. (%) | Size (um) | Type | Wt. (%) | Size (um) | Wt. (%) | 0.33 C | 0.5 C | 1.0 C | 2.0 C |
| Example 1 | 96 | 27 | graphene | 1 | 30 | 3 | 102 | 90 | 75 | 53 |
| Example 2 | 92 | 27 | graphene | 5 | 30 | 3 | 104 | 101 | 95 | 82 |
| Example 3 | 96 | 27 | graphene | 1 | 100 | 3 | 102 | 88 | 72 | 50 |
| Comparative Example 1 | 96 | 27 | carbon black | 1 | 100 nm or less | 3 | 96 | 83 | 50 | 16 |
| Comparative Example 2 | 96 | 27 | graphene | 1 | 0.2 | 3 | 99 | 87 | 56 | 25 |
| Comparative Example 3 | 96.95 | 27 | graphene | 0.05 | 30 | 3 | 67 | 45 | 12 | 2 |
| Comparative Example 4 | 82 | 27 | graphene | 15 | 30 | 3 | 104 | 102 | 96 | 83 |

Further, there is a difference in that Example 2 contains lithium manganese oxide and carbon graphene in a ratio of lithium manganese oxide:carbon graphene=92 parts by weight:5 parts by weight, whereas Comparative Example 4 contains in a ratio of lithium manganese oxide:carbon graphene=82 parts by weight:15 parts by weight. Thereby, when the free-standing film contains a slightly large amount of carbon graphene as in Comparative Example 4, it can be confirmed that the tensile strength is significantly deteriorated.

Accordingly, it can be confirmed that the frees-standing film exhibits an excellent tensile strength when lithium manganese oxide and carbon graphene are mixed in an appropriate ratio. In one example, when mixed in a ratio of lithium manganese oxide:carbon graphene=86 to 96.9 parts by weight:0.1 to 10 parts by weight, the free-standing film can exhibit an excellent tensile strength.

Experimental Example 3 (Measurement of Discharge Capacity)

For Examples 1 to 3 and Comparative Examples 1 to 4, the free-standing film produced in Experimental Example 1 was roll-pressed on a current collector which is an aluminum foil, and then the positive electrode was produced under the conditions of the loading value of 5 $mAh/cm^2$ and the porosity of 30%, and lithium metal having a thickness of 200 um was used as the negative electrode to produce coin half-cell. Here, each coin half-cell produced in Examples 1 to 3 and Comparative Examples 1 to 4 were charged at 0.33C, and then discharged at 0.33C, 0.5C, 1.0C, and 2.0C to measure the discharge capacity value, and the results are shown in Table 2 below.

In addition, the comparison result of the discharge capacity value according to the size of the conductive material Experimental Example 2, Table 2, and FIGS. 6 and 7 will be described together below.

First, referring to FIG. 6, when comparing Example 1, Example 3, Comparative Example 1, and Comparative Example 2, in which the composition of the free-standing film is the same as lithium manganese oxide:conductive material:polytetrafluoroethylene=96 parts by weight:1 part by weight:3 parts by weight, it is confirmed that Examples 1 and 3 have a relatively low rate of change of the discharge capacity value according to the change of the C-rate, but it can be confirmed that Comparative Example 1 and Comparative Example 2 have a high rate of change of the discharge capacity value. There is a difference in that Examples 1 and 3 have values of 30 um and 100 um in which the size of the conductive material is equal to or larger than the size (27 um) of lithium manganese oxide, whereas Comparative Examples 1 and 2 have values of 100 nm or less and 0.2 um in which the size of the conductive material is smaller than the size (27 um) of lithium manganese oxide.

Accordingly, it can be confirmed that the rate of change of the discharge capacity value of the electrode is low when the size of the conductive material has a value equal to or larger than the size (27 um) of lithium manganese oxide. That is, when the size of the conductive material has a value equal to or larger than the size (27 um) of lithium manganese oxide, it can be confirmed that the carbon coating and the mixing degree with polytetrafluoroethylene are excellent, and the resistance reduction effect due to the activation of the conductive network is excellent.

Further, when comparing Example 1, Example 2, Comparative Example 3, and Comparative Example 4, in which the size (27 um) of the lithium manganese oxide and the size (30 um) of the conductive material are the same, it can be confirmed that the rate of change of the discharge capacity value of Example 2 and Comparative Example 4 is very low and the rate of change of the discharge capacity value of Example 1 is relative low, whereas the rate of change of the discharge capacity value of Comparative Example 3 is relatively high.

There is a difference in that Example 1 contains lithium manganese oxide and carbon graphene in a ratio of lithium manganese oxide:carbon graphene=96 parts by weight:1 part by weight, whereas Example 2 contains in a ratio of lithium manganese oxide:carbon graphene=92 parts by weight:5 parts by weight, and Comparative Example 4 contains in a ratio of lithium manganese oxide:carbon graphene=82 parts by weight:15 parts by weight. Accordingly, in the case of an electrode containing a large proportion of the weight part of carbon graphene compared to Example 1, it can be confirmed that the resistance reduction effect due to the activation of the conductive network by carbon graphene is excellent.

However, when comparing Example 2 and Comparative Example 4, it can be confirmed that when the weight part of graphene carbon is larger than a certain amount, the discharge capacity value changes similarly. Thereby, it can be confirmed that the resistance reduction effect is superior as the proportion of the weight part of carbon graphene increases, but it can be confirmed that the difference in resistance reduction effect is not large when the amount is more than a certain amount.

In addition, there is a difference in that Example 1 contains lithium manganese oxide and carbon graphene in a ratio of lithium manganese oxide:carbon graphene=96 parts by weight:1 part by weight, whereas Comparative Example 3 contains in a ratio of lithium manganese oxide:carbon graphene=96.95 parts by weight:0.05 parts by weight. In the case of an electrode containing an excessively low proportion of the weight part of carbon graphene compared to Example 1, it can be confirmed that the resistance reduction effect due to the activation of the conductive network by carbon graphene is reduced.

Accordingly, it can be confirmed that the rate of change of the discharge capacity value of the electrode is excellent when lithium manganese oxide and carbon graphene are mixed in an appropriate ratio. In one example, when carbon graphene is mixed in a ratio of 0.06 or more to 15 or less by weight, the rate of change of the discharge capacity value of the electrode is small, and accordingly, the effect of reducing the resistance may be excellent.

Although the invention has been shown and described with reference to the preferred embodiments, the scope of the present disclosure is not limited thereto, and various modifications and improvements made by those skilled in the art using the basic concepts of the present disclosure, which are defined in the appended claims, also belong to the scope of the present disclosure.

The invention claimed is:

1. An electrode for a secondary battery which comprises:
- an electrode current collector; and
- an active material layer which comprises an electrode composition and is formed on the electrode current collector,
- wherein the electrode composition comprises an active material whose surface is dry-coated with a conductive material, and a binder which is dry-mixed with the active material,
- wherein the conductive material encapsulates a majority portion of the surface of the active material, without the conductive material being stacked inside an unevenness defined on the surface of the active material,
- wherein the size of the active material is 27 um to 30 um, and
- wherein the active material is lithium manganese oxide (LMO).

2. The electrode for a secondary battery of claim 1, wherein:
- the conductive material comprises a carbon graphene material having a size equal to or larger than a size of the active material.

3. The electrode for a secondary battery of claim 2, wherein:
- the size of the active material and the size of the conductive material have a ratio of 1:1 to 1:25.

4. The electrode for a secondary battery of claim 1, wherein:
- a size of the conductive material is 25 um to 120 um.

5. The electrode for a secondary battery of claim 1, wherein:
- the binder is polytetrafluoroethylene (PTFE).

6. The electrode for a secondary battery of claim 1, wherein:
- the electrode composition is a free-standing film, and
- the free-standing film is disposed on the electrode current collector.

7. The electrode for a secondary battery of claim 6, wherein:
- the free-standing film has a tensile strength of 9 $kgf/cm^2$ to 20 $kgf/cm^2$.

8. A method for producing the electrode of claim 1 comprising:
- dry-coating the conductive material onto the surface of the active material;
- dry-mixing the active material coated with the conductive material and the binder to prepare the electrode composition; and
- attaching the electrode composition to the electrode current collector to form the electrode.

9. The method of claim 8, wherein:
- in the electrode composition, the active material, the conductive material, and the binder are contained in a ratio of, a parts by weight:b parts by weight:c parts by weight, respectively,
- the sum of a parts by weight and b parts by weight is 95 parts by weight to 99 parts by weight, and
- the c parts by weight are 1 part by weight to 5 parts by weight.

10. The method of claim 9, wherein:
- the sum of the a parts by weight and the b parts by weight is 96.5 parts by weight to 97.5 parts by weight, and
- the c parts by weight are 2.5 parts by weight to 3.5 parts by weight.

11. The method of claim 10, wherein:
- the a parts by weight:the b parts by weight has a ratio of 82.1 to 96.9 parts by weight:0.1 to 14.9 parts by weight.

12. The method of claim 8,
- which further comprises preparing the electrode composition as a free-standing film,
- wherein the free-standing film is attached on the electrode current collector.

13. The method of claim 12, wherein:
- the free-standing film has a tensile strength of 9 $kgf/cm^2$ to 20 $kgf/cm^2$.

14. A secondary battery comprising the electrode for secondary battery of claim 1 and a separator.

15. The electrode for a secondary battery of claim 1, wherein:

a thickness of the conductive material is uniform.

* * * * *